United States Patent [19]

Suzuki

[11] Patent Number: 4,866,475
[45] Date of Patent: Sep. 12, 1989

[54] SIMULATOR FOR AUTOMATIC PHOTOGRAPHIC PRINTERS

[75] Inventor: Kenji Suzuki, Kanagawa, Japan

[73] Assignee: Fuji Photo Film Co., Ltd., Kanagawa, Japan

[21] Appl. No.: 206,787

[22] Filed: Jun. 15, 1988

[30] Foreign Application Priority Data

Jun. 17, 1987 [JP] Japan .............................. 62-150401

[51] Int. Cl.⁴ ............................................ G03B 27/72
[52] U.S. Cl. ...................................... 355/38; 355/68
[58] Field of Search ............... 355/38, 68, 77; 358/76, 358/80, 32, 164

[56] References Cited

U.S. PATENT DOCUMENTS

| | | | |
|---|---|---|---|
| 4,393,398 | 7/1983 | Horiguchi et al. | 358/80 X |
| 4,736,244 | 4/1988 | Shiota et al. | 358/76 |
| 4,736,245 | 4/1988 | Seto et al. | 358/76 |
| 4,812,874 | 3/1989 | Suzuki | 355/38 |

FOREIGN PATENT DOCUMENTS 61-140298  6/1986  Japan ..................................... 355/20

Primary Examiner—L. T. Hix
Assistant Examiner—D. Rutledge
Attorney, Agent, or Firm—Sughrue, Mion, Zinn, MacPeak & Seas

[57] ABSTRACT

A simulator for automatic color photographic printers which are adapted to print an image recorded on a film on a sheet of printing paper as a final print. Said image is picked up by an image sensor and displayed on a CRT as an image that is identical with the final print. The simulator includes a gamma correction circuit which processes the output signals from the image sensor without transducing them logarithmically, performing gamma correction such that the total gamma of said CRT and the output signals of said gamma correction circuit is made equal substantially equal to the gamma of the printing paper, whereby the image simulated can be displayed on the CRT with a high accuracy without deterioration of the image signals detected by the image sensor.

11 Claims, 2 Drawing Sheets

SIMULATOR FOR AUTOMATIC PHOTOGRAPHIC PRINTERS

BACKGROUND OF THE INVENTION

1. Field of the Invention

This invention relates to a simulator for automatic photographic printers, and more particularly relates to a simulator for automatic photographic printers adapted to display on a CRT an image that is the same as that of a final print to be printed on be printing paper sheet by means of an automatic color photographic printer.

2. Description of the Related Art

It is well known in the art to employ an automatic color photographic printer which is capable of performing printing and developing in such a manner that the density and color balance of all the final prints are the same, irrespective of the extent of shading on the negative film (underexposure, proper exposure, overexposure). This is done by measuring the cumulative transmission density (LATD) to correct the density and by conducting slope control. Such an automatic color photographic printer includes an optical system comprising a light source, a dimmer filter, a mirror chamber, a negative carrier and a black shutter, arranged in succession. Printing with such a printer is effected as follows first, a color negative film is set on the negative carrier, and the light source is turned on. Then the black shutter is opened to allow the image on the negative film to be focused on a paper sheet for printing and be printed thereon. The final print can then be automatically obtained by developing the printing paper sheet through a development process. In this automatic photographic printer, a photocell resolves a light beam transmitted through a negative film into the three primary color rays, red (R), green (G) and blue (B), to perform density control using the LATD in accordance with Evans's Theorem. At the same time, color balance is controlled by performing slope control in such a manner that slope agreement may be attained for the three primary colors. Consequently, this automatic color photographic printer enables all final prints to be obtained with the same density and color balance.

However, even when the main subject is properly exposed, a high or low background density may give rise to a density problem, the exposure being controlled under the influence of the background density. Further, when the color balance of the main subject differs from that of the background, which is the case, for example, when the color of the main subject and that of the background have a complementary relationship, a color failure may be generated. Accordingly, the quality of the final print may be poor even when the density and slope control are performed. Such a poor print quality requires that the printing and development be conducted again.

To cope with this problem, what is called a photographic tester has been put in use, as is disclosed in Japanese Patent Laid-Open No. 46731/78. Such a photographic tester includes a simulator which is adapted to display the image of a negative film picked up by a television camera on a television screen, and which, while thus displaying the image, adjusts the color video signal in such a manner that the desired density and color balance are obtained. Printing is performed by an automatic photographic printer using the color video signal thus adjusted. In another simulator, which is disclosed in Japanese Patent Publication No. 25220/67, the image of a negative film to be printed on a printing paper sheet is displayed on a television screen, and an automatic exposure device is connected with the resistance to enable brightness and contrast adjustment of the television picture. In this way, picture simulation can be performed so that the necessity for repeating printing and development operations may be eliminated as much as possible.

Since, however, the gamma of a conventional television is approximately 2.2, a gamma correction circuit of gamma=0.45 is incorporated in the camera so that the gamma of the entire device may be 1. On the other hand, prints are usually finished with gamma=2.0 since a high-contrast finish is preferable in appearance. Thus it has been necessary to provide in the simulator a gamma correction circuit of gamma=2.0 to conduct a gamma correction corresponding to the gamma characteristics of the printing paper used. This results in the gamma of the color negative film (about 0.6) being both decreased by the gamma correction circuit of the camera and increased by that in the simulator, which leads to deterioration of the SN ratio and the television image quality. The construction also involves a rather high production cost because it requires two gamma correction circuits, gamma correction being effected both in the camera and in the simulator.

SUMMARY OF THE INVENTION

This invention is intended to obviate the above problems. Accordingly, it is an object of this invention to provide a simulator for an automatic photographic printer which permits printing to be performed with a satisfactory SN ratio and a low production cost.

To attain the above object, the present invention is directed to a simulator for automatic color photographic printers which are adapted to print an image recorded on a film on a printing paper sheet to obtain a final print, said image being picked up by an image sensor and displayed on a CRT as an image that is identical with the final print, comprising: a gamma correction means adapted to receive the output signals from said image sensor and to conduct gamma correction such that the total gamma of said CRT and the output signals from said gamma correction means is made equal substantially to the gamma of the printing paper, without logarithmically transducing said output signals of said image sensor; and a transduction means adapted to receive the output signals from said gamma correction means and transduce them into the luminance signals for the CRT which are output to the CRT.

Further, in accordance with this invention, a film is picked up by an image sensor while it is illuminated by a light source system which is dimmed by an automatic exposure control function of the automatic color photographic printer.

Instead of using a logarithmic circuit and an inverse logarithmic circuit, in other words, instead of obtaining density information from the image sensor output, the simulator in accordance with this invention makes use of the image sensor output as it is and performs correction such that the total gamma of the CRT and the output signal of the gamma correction means is made equal substantially to the gamma of the printing paper sheet, using the single gamma correction means.

As described above, in accordance with this invention, the gamma correction of the output signals of the image sensor is effected without logarithmically transducing the output signals of the image sensor, which makes it possible to provide a simulator involving no deterioration in image signals and with a simple construction and a low production cost.

DETAILED DESCRIPTION OF THE PREFERRED EMBODIMENT

Figure 1:
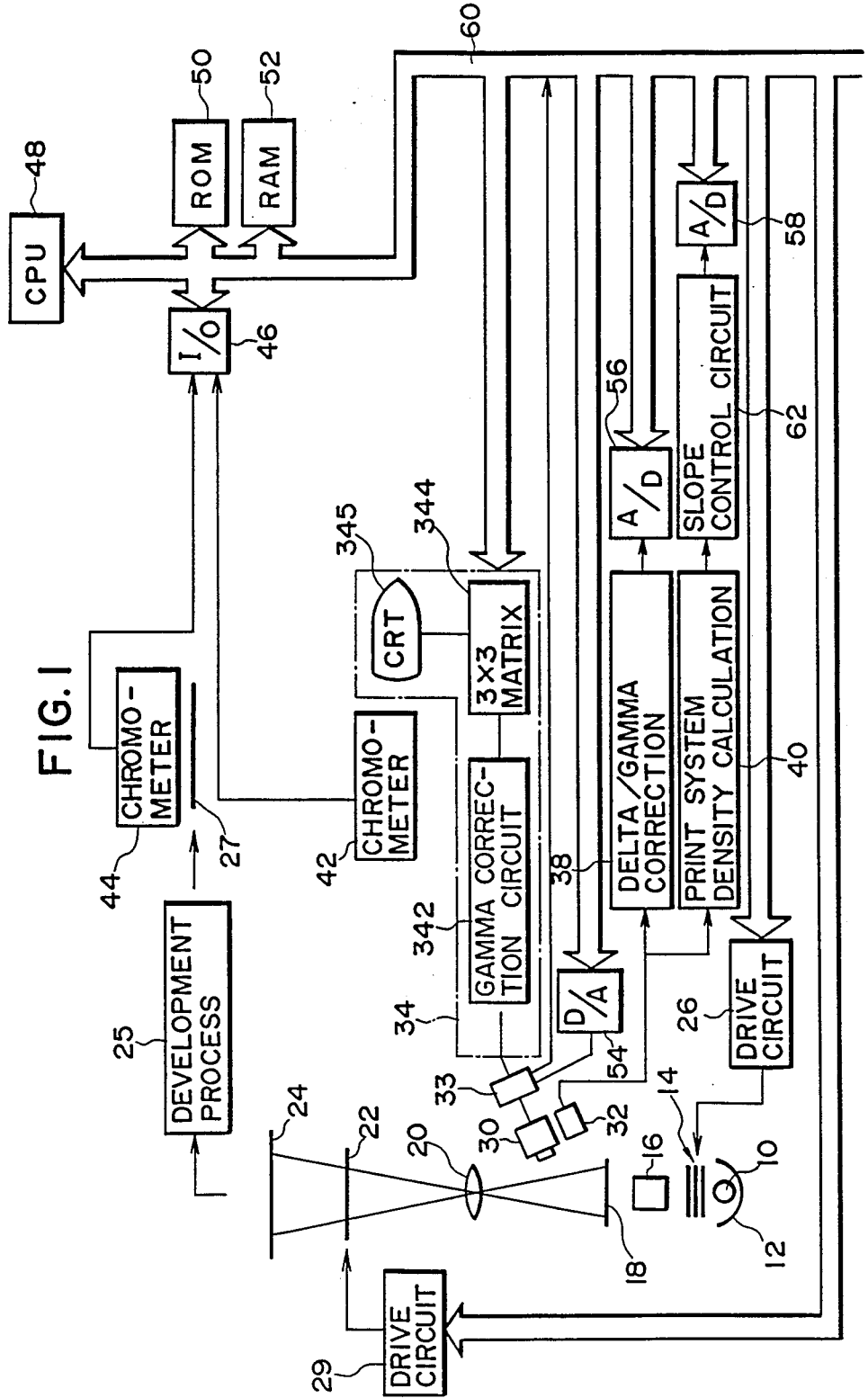
FIG. 1 is a block diagram illustrating an embodiment of the present invention.

An embodiment of this invention will now be described in detail referring to the drawings. This embodiment is composed of an automatic color photographic printer (hereinafter referred to as "printer") and a simulator adapted to display an image in the same state as that would be obtained by printing the negative film.

As shown in FIG. 1, on the rear side of a light source 10 composed of a halogen lamp a reflecting mirror 12 consisting of a cold mirror. To the light source 10 is fed ca. 90% of the rated voltage from a power source not shown in order to prolong the life of the light source 10 and to attain the predetermined color temperature. On the irradiation side of the light source 10 are arranged in succession a dimmer filter 14 composed of three complementary color filters, Y (yellow), M (magenta) and C (cyan), each consisting of two quarter-sector-shaped plates formed in a logarithmic curve and combined and disposed symmetrically, and a mirror chamber 16 equipped with a scattering plate. The light beam irradiated by the light source 10 is adjusted in color balance and intensity by the dimmer filter 14 and transduced by the mirror chamber 16 into an evenly diffused light, which is applied to a color negative film 18 held by a negative carrier. To adjust the voltage of said light source, the complementary color filters of the dimmer filter 14 are set in the mechanical center and the intensity is measured with an illuminance meter to adjust the intensity to a constant degree (standard exposure time) so that ca. 90% of the rated voltage may be supplied. On the exit side of the light beam transmitted through the color negative film 18 are arranged an optical system 20 and a black shutter 22, in succession. By opening the black shutter 22, the light beam transmitted through the color negative film 18 is allowed to focus the image of the film on a printing paper sheet 24, which is then exposed. The exposed sheet 24 undergoes a development process 25 and is then printed at 27.

To the dimmer filter 14 is connected a drive circuit 26, which moves the complementary color filters in the direction perpendicular to the light beam axis, thereby adjusting the color balance and intensity. Another drive circuit 29 is connected to the black shutter 22.

In the vicinity of the optical system 20 of the color negative film 18 are arranged an image sensor 30 as well as an image information detector 32 which is equipped with a two-dimensional image sensor for detecting image density information on the three primary colors R, G and B. The two-dimensional image sensor is composed of a CCD (charge coupled device). The image sensor 30 can also be constituted by a single plate CCD camera or a camera in which a gamma correction circuit (gamma$\approx$0.45) is not installed.

The above image sensor 30 is connected to a gamma correction circuit 342 composing simulator 34 through the intermediary of a gain control circuit 33. This gamma correction circuit 342 is connected to a CRT 345 through the intermediary of a 3×3 matrix circuit 344, which is adapted to transduce the output of the gamma correction circuit 342 into the analytic luminance of the fluorescent substance of the CRT. The CRT 345 is adapted to display images picked up with the camera 30, coloring the fluorescent substance in accordance with the output of the 3×3 matrix circuit 344.

In the prior art previously proposed by the applicant of the present invention, the density in terms of the spectral sensitivity of the camera and the density in terms of the spectral sensitivity of the printing paper are made to agree with each other by obtaining density information through logarithmic transduction of the camera output, which density information underwent inverse logarithmic transduction to attain coloring at the CRT, thereby obtaining transmissivity information. In the present embodiment, on the other hand, the transmissivity information detected by the camera is utilized as it is, so that the logarithmic and inverse logarithmic transduction are not performed. In an ordinary television system, the television gamma is 2.2 or so, so that a gamma correction circuit of gamma=0.45 is provided for the gamma of the entire system to be approximately 2.0. Since, however, prints are usually finished with gamma=2.0 to obtain a high-contrast finish, the image sensor 30 or the camera in which a gamma correction circuit is not installed is employed. Instead, a single gamma correction circuit is provided in the simulator in order to conduct the gamma correction of the output of the image sensor 30 such that the total gamma of the CRT and the output of the gamma correction circuit is made equal substantially to the gamma of the printing paper sheet.

Figure 2:
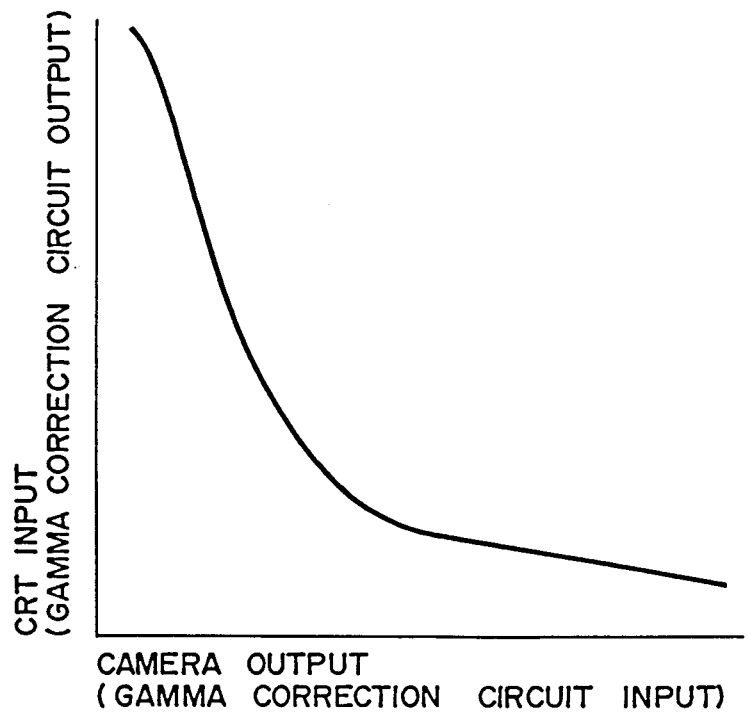
FIG. 2 is a chart showing a gamma curve.

Accordingly, the gamma correction circuit 342 transduces the camera output in accordance with the gamma curve shown in FIG. 2. This gamma curve is so determined that the input of the gamma correction circuit is approximately in inverse proportion to the output therefrom. In the gamma correction circuit, the transduction of the camera output may be effected using a function. By thus using a single gamma correction circuit, the production cost can reduced and the the CRT image quality improved.

The above image information detection circuit 32 is connected to a slope control circuit 62 through the intermediary of a delta/gamma correction circuit 38 and a print system density calculation circuit 40. The above-described color balance and density correction are effected by the print system density calculation circuit 40 and the slope control circuit 62. Further, a chromometer 42 is arranged in a position opposite to the screen of the CRT 345 composing the simulator 34 and a chromometer 44 is arranged in a position facing the print 27. The chromometers 42 and 44 are connected to an I/O port composing a computer. This computer includes, besides the above I/O port 46, a CPU 48, a read only memory (ROM) 50, a random access memory (RAM) 52, a digital/analog (D/A) converter 54, an analog/digital (A/D) converters 54, 56 as well as bus 60 including a data bus and a control bus connecting these to each other; the computer is connected to a gain control circuit 33, the simulator 34, the delta/gamma correction circuit 38, the slope control circuit 62 connected to the print system density calculation circuit 40, the drive circuit 26 as well as the drive circuit 29.

Further, to conform the chromaticity of the CRT with that of the printing paper as much as possible, the following 3×3 matrix is employed:

$$T = F(T_0) \quad \ldots (1)$$

The above function F can be determined by previously setting the output $T_0$ and the luminance signal T to optimum values and by performing optimization by means of the least square method, recursion or the like.

The CRT is controlled by the luminance signal thus obtained by means of the 3×3 matrix circuit 344, and displays an image with coloring characteristics agreeing with those of the printing paper.

What is claimed is:

1. A simulator for automatic color photographic printers which are adapted to print an image recorded on a film on a printing paper sheet to obtain a final print, said image being picked up by an image sensor and displayed on a CRT as an image that is identical with the final print, comprising:
   a gamma correction means adapted to receive the output signals from said image sensor and to conduct gamma correction such that the total gamma of said CRT and the output signals from said gamma correction means is made equal substantially to the gamma of the printing paper, without logarithmically transducing said output signals of said image sensor; and
   a transduction means adapted to receive the output signals from said gamma correction means and to transduce them into the luminance signals for said CRT which are output to said CRT.

2. A simulator for automatic color photographic printers as claimed in claim 1, wherein said film is picked up by said image sensor while being illuminated by a light source system which is dimmed by an automatic exposure control function of said automatic color photographic printer.

3. A simulator for automatic color photographic printers as claimed in claim 2, wherein said transduction means comprises a 3×3 matrix circuit.

4. A simulator for automatic color photographic printers as claimed in claim 2, wherein said gamma correction means is so designed that it receives image information detected by said image sensor as it is, as the output signal from said image sensor.

5. A simulator for automatic color photographic printers which are adapted to print a negative image recorded on a color negative film on a printing paper sheet as a positive image, said negative image being picked up by an image sensor, three signals R, G and B being produced from the output signals of said image sensor and said negative image being displayed on a CRT as a positive image identical with that to be printed on said printing paper sheet, comprising:
   a gamma correction circuit adapted to receive the output signals from said image sensor and to perform gamma correction such that the total gamma of said CRT and the output signals from said gamma correction circuit is made substantially equal to the gamma of the printing paper, without performing logarithmic transduction of said output signals of said image sensor;
   a transduction circuit adapted to receive the output signals of said gamma correction circuit and to transduce the output signals of said gamma correction circuit into the luminance signals of the color R, G and B for said CRT; and
   said CRT adapted to display said positive image that is identical with that to be printed on said printing paper, in accordance with said luminance signals.

6. A simulator for automatic color photographic printers as claimed in claim 5, wherein said film is picked up by said image sensor while being illuminated by a light source system which is dimmed by ah automatic exposure control function of said automatic color photographic printer.

7. A simulator for automatic color photographic printers as claimed in claim 6, wherein said transduction circuit comprises a 3×3 matrix circuit.

8. A simulator for automatic color photographic printers as claimed in claim 6, wherein said gamma correction circuit receives the image information detected by said image sensor as it is, as the output signals from said image sensor.

9. A simulator for automatic color photographic printers which are adapted to print a negative image recorded on a color negative film on a printing paper sheet as a positive image, said negative image being picked up by an image sensor having a gamma of ca. 1, while being illuminated by a light source system dimmed by an automatic exposure control function of said automatic color photographic printer, three R, G, B signals being produced from the output signals of said image sensor, and said negative image being displayed on a CRT as a positive image that is identical with that which is to be printed on said printing paper sheet, comprising:
   a gamma correction circuit adapted to received the output signals from said image sensor and to perform gamma correction such that the total gamma of said CRT and the output signals from said gamma correction circuit is made substantially equal to the gamma of the printing paper, without logarithmically transducing the output signals of said image sensor;
   a transduction circuit adapted to transduce the output of said gamma correction circuit into the luminance signals of the three colors R, G and B for said CRT; and
   said CRT adapted to display said positive image in accordance with said luminance signals and having a gamma of ca. 2.2.

10. A simulator for automatic color photographic printers as claimed in claim 9, wherein said transduction circuit comprises a 3×3 matrix circuit.

11. A simulator for automatic color photographic printers as claimed in claim 9, wherein said gamma correction circuit receives the image information detected by said image sensor as it is, as the output signals of said image sensor.

* * * * *